(12) United States Patent
Redbrandt et al.

(10) Patent No.: US 9,014,929 B2
(45) Date of Patent: Apr. 21, 2015

(54) METHOD AND SYSTEM FOR DETERMINATION OF A NEED FOR CONTACT POINT ADAPTATION

(75) Inventors: Karl Redbrandt, Solna (SE); Andreas Laghamn, Södertälje (SE)

(73) Assignee: Scania CV AB (SE)

( * ) Notice: Subject to any disclaimer, the term of this patent is extended or adjusted under 35 U.S.C. 154(b) by 26 days.

(21) Appl. No.: 14/001,771

(22) PCT Filed: Mar. 12, 2012

(86) PCT No.: PCT/SE2012/050272
§ 371 (c)(1),
(2), (4) Date: Aug. 27, 2013

(87) PCT Pub. No.: WO2012/125110
PCT Pub. Date: Sep. 20, 2012

(65) Prior Publication Data
US 2013/0345940 A1    Dec. 26, 2013

(30) Foreign Application Priority Data
Mar. 14, 2011 (SE) ........................................ 1150217

(51) Int. Cl.
*F16D 48/06* (2006.01)
*B60W 10/00* (2006.01)

(52) U.S. Cl.
CPC ...... *F16D 48/06* (2013.01); *F16D 2500/30404* (2013.01); *F16D 2500/30405* (2013.01); *F16D 2500/50251* (2013.01)

(58) Field of Classification Search
CPC ....... F16D 48/06; F16D 48/00; F16D 48/062; F16D 2048/0221; B60W 10/00; B60W 10/023; B60W 10/119; G06F 17/00; G06F 19/00
USPC ................................ 701/53, 67; 477/166, 176
See application file for complete search history.

(56) References Cited

U.S. PATENT DOCUMENTS 5,190,130 A * 3/1993 Thomas et al. ................ 477/176
5,318,100 A * 6/1994 Aoki ............................. 165/202
(Continued)

FOREIGN PATENT DOCUMENTS

JP    2005-273875    10/2005
WO    WO 03/016743 A1    2/2003

OTHER PUBLICATIONS

International Search Report dated Apr. 18, 2012 issued in corresponding International patent application No. PCT/SE2012/050272.
(Continued)

*Primary Examiner* — Tan Q Nguyen
(74) *Attorney, Agent, or Firm* — Ostrolenk Faber LLP (57) ABSTRACT

A method for determining a need for contact point adaptation for a clutch (106) of a vehicle (100), which clutch (106) transmits driving power between a power source engine (101) and at least one powered wheel (113, 114). At a first point in time, determining a first temperature (T1) of the clutch (106), comparing the first temperature (T1) with a second temperature (T2) of said clutch (106) determined at a second point in time which precedes the first point in time, and determining a need for contact point adaptation when the first temperature (T1) differs from the second temperature (T2) by more than a first value ($\Delta T$)).

14 Claims, 6 Drawing Sheets

(56) References Cited

U.S. PATENT DOCUMENTS 5,993,352 A 11/1999 Kosik et al.
2004/0157704 A1* 8/2004 Stork et al. .................. 477/166

OTHER PUBLICATIONS

Russian Office Action issued in Russian Application No. 2013145685/11(070716) dated Dec. 3, 2014 with an English translation.

* cited by examiner

METHOD AND SYSTEM FOR DETERMINATION OF A NEED FOR CONTACT POINT ADAPTATION

CROSS-REFERENCE TO RELATED APPLICATIONS

The present application is a 35 U.S.C. §§371 national phase conversion of PCT/SE2012/050272, filed Mar. 12, 2012, which claims priority of Swedish Patent Application No. 1150217-6, filed Mar. 14, 2011, the contents of which are incorporated by reference herein. The PCT International Application was published in the English language.

FIELD OF THE INVENTION

The present invention relates to vehicles with automatically controlled clutches and in particular to a method and a system for determining a need for contact point adaptation for a clutch. The invention relates also to a system that uses the system.

BACKGROUND TO THE INVENTION

In vehicles in general, various different power train configurations occur, e.g. the gearbox may take the form of a manually operated gearbox or an automatic gearbox. In the case of heavy vehicles, it is often desirable for them to be drivable in as comfortable a way for the driver as possible, which usually entails the gear changes in the gearbox being effected automatically by means of the vehicle's control system. Gearboxes which change gear automatically have therefore also become increasingly usual in heavy vehicles.

This automatic gear changing is often effected in heavy vehicles by control system control of gear changes in "manual" gearboxes (also called AMT, automated manual transmission), partly because they are substantially less expensive to make, but also because of their greater efficiency.

The efficiency of automatic gearboxes of the type often provided in cars is far too low to be justified other than in, for example, urban buses and distribution vehicles which have frequently to come to a halt and then move off again.

"Manual" gearboxes which change gear automatically are therefore usual in heavy vehicles largely used on motorways/national highways.

This gear changing may be effected in various different ways, one of which involves using an automatically controlled clutch for up/downshifts, in which case the driver only needs access to an accelerator pedal and a brake pedal.

In principle, the clutch need only be used to set the vehicle in motion from stationary, as other gear changes can be effected by the vehicle's control system without using the clutch at all, since they are instead effected "torque-free". It is also possible for the automatically controlled clutch to be used for only certain gear steps or only in upshifts or downshifts.

For comfort reasons and to make quicker gear changes possible, however, the automatically controlled clutch is in many cases used in all or substantially all upshifts and downshifts. On vehicles with automatic clutches, it is important to know the clutch's contact point (traction position), i.e. the position at which the clutch begins to transmit torque.

By knowing the contact point when for example the vehicle is moving off, coming to a halt and changing gear thus provides its control system with knowledge of the clutch position at which torque transfer from the engine to the rest of the power train begins or ends, so setting the vehicle in motion and changing gear can also be effected in such a way as not to cause unacceptable jerking or unacceptable wear in the power train.

The contact point is however not a fixed position but may vary, e.g. because the clutch wears. It may also change when the vehicle is in motion, which means that even if it is determined at the beginning of a journey there is no certainty that the actual contact point later in the journey will correspond to that determined at the beginning.

There is thus a need for an improved method for determining the vehicle's contact point.

SUMMARY OF THE INVENTION

An object of the present invention is to propose a method for determining a need for contact point adaptation which solves the above problem.

The present invention relates to a method for determining a need for contact point adaptation for a clutch of a vehicle, which clutch is intended for selective transfer of driving power between an engine and at least one powered wheel. The method comprises, at a first point in time, determining a first temperature of said clutch and comparing said first temperature of said clutch with a second temperature determined at another point in time which precedes said first point in time. There is deemed to be a need for contact point adaptation when said first temperature differs from said second temperature by more than a first value.

The position of the clutch's contact point, i.e. the clutch position from which torque transfer between engine and gearbox can take place, may be highly temperature-dependent. It may however be difficult to ascertain how much the position of the clutch changes with temperature. The method according to the present invention affords the advantage that the clutch's contact point can be determined again when it is likely that a contact point position assumed in the vehicle's control system on the basis of a preceding contact point adaptation does not correspond to the actually prevailing contact point.

Accordingly, this determination is done when the clutch's temperature has changed so much that it is to be expected that the contact point will also have changed to such an extent that desired characteristics pertaining to opening/closing of the clutch, e.g. during gear changes, can be maintained. Further characteristics of the present invention and advantages thereof are indicated by the detailed description of embodiments set out below and the attached drawings.

DETAILED DESCRIPTION OF EMBODIMENTS

Figure 1A:
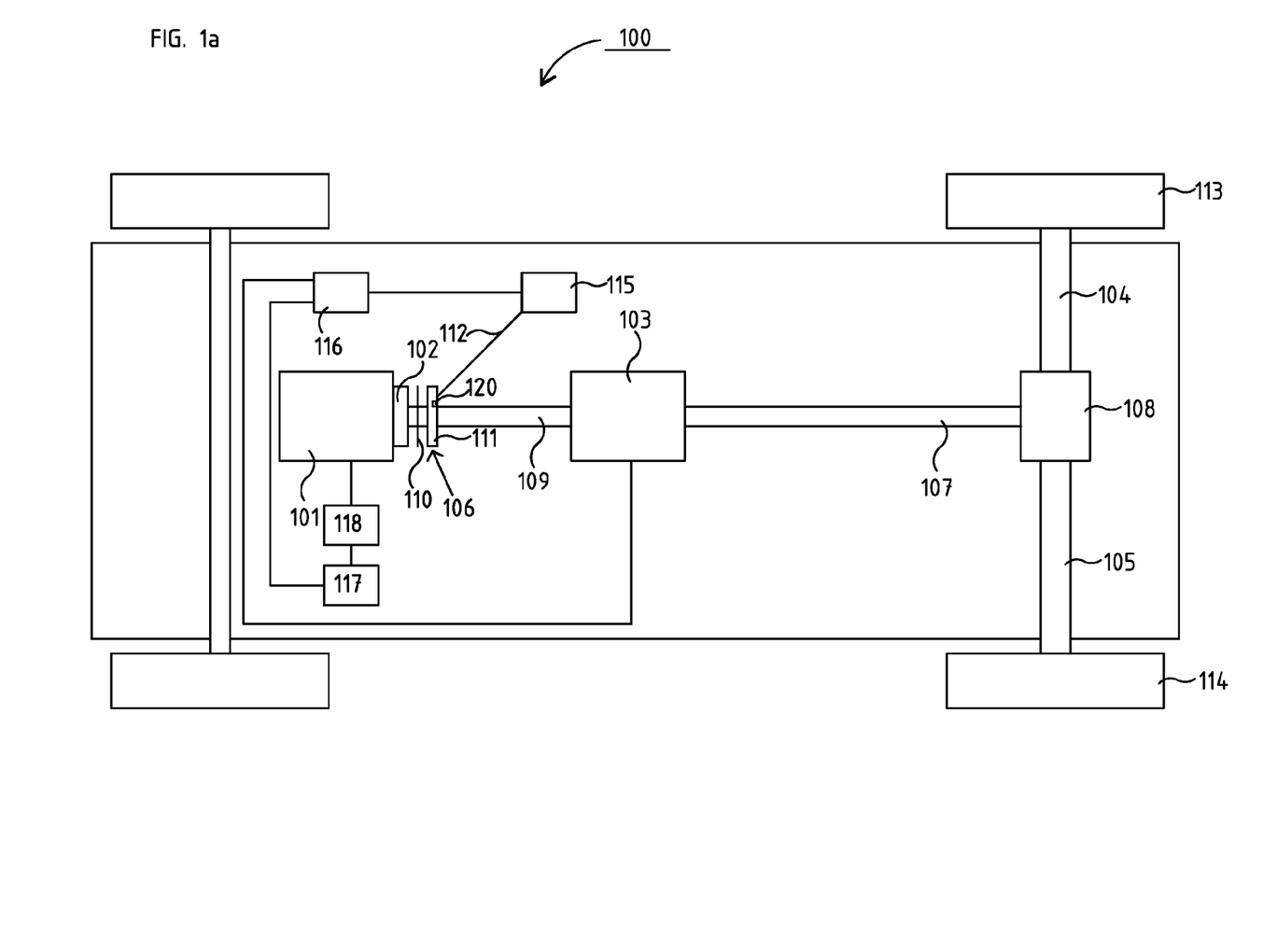
FIG. 1a depicts a power train of a vehicle in which the present invention may be used.

FIG. 1a depicts a power train of a vehicle 100 according to an embodiment of the present invention. The vehicle 100 schematically depicted in FIG. 1 has only one axle provided with powered wheels 113, 114 but the invention is also applicable on vehicles in which more than one axle is provided with powered wheels. The power train comprises a first power source in the form of a combustion engine 101 which in a conventional way, via an output shaft of the engine, usually via a flywheel 102, is connected to a gearbox 103 via a clutch 106.

The clutch 106 takes the form of an automatically controlled clutch and in this embodiment is of disc type whereby a friction element (disc) 110 connected to a first gearbox element, e.g. an input shaft 109 of the gearbox 103, engages selectively with the flywheel 102 to transfer driving power from the engine 101 to the powered wheels 113, 114 via the gearbox 103. The engagement of the clutch disc 110 with the engine flywheel 102 is controlled by means of a pressure plate 111 which is movable sideways, e.g. by means of a lever arm 112, the function of which is controlled by a clutch actuator 115. The action of the clutch actuator 115 on the lever arm 112 is itself controlled by the vehicle's control system.

Control systems in modern vehicles usually comprise a communication bus system composed of one or more communication buses for connecting together a number of electronic control units (ECUs), or controllers, and various components located on the vehicle. Such a control system may comprise a large number of control units and the responsibility for a specific function may be divided between two or more control units.

For the sake of simplicity, FIG. 1a shows only control units 116, 117, 118, but those skilled in the art will appreciate that vehicles of the type here concerned often have significantly more control units.

Control unit 116 controls the clutch 106 (the clutch actuator 115) and the gearbox 103, and in the embodiment depicted the present invention is implemented in control unit 117. Control unit 117 may be a control unit dedicated for the present invention, but the present invention may also be implemented wholly or partly in one or more other already existing control units of the vehicle, e.g. control unit 116 and/or control unit 118 which here controls the vehicle's engine 101.

The control exercised by control unit 116 over the clutch actuator 115 and the gearbox 103 is also likely to depend not only on control unit 117 but also on, for example, information received from the one or more control units which control engine functions, viz. in the present example control units 116, 118.

Control units of the type here concerned are normally arranged to receive sensor signals from various parts of the vehicle, e.g. control unit 116 may receive sensor signals representing the position of the clutch disc and/or of the lever arm.

Control unit 117 may for example receive signals from the control unit 116 and also from, for example, the engine control unit 118. The control unit may also receive signals from one or more temperature sensors 120 as below. Control units of the type here concerned are also usually arranged to deliver control signals to various vehicle parts and components. In the present example, control unit 117 delivers signals, for example, to control unit 116 during contact point adaptation.

Control is often governed by programmed instructions, typically in the form of a computer programme which, when executed in a computer or control unit, causes the computer/control unit to effect desired forms of control action, e.g. method steps according to the present invention. The computer programme usually takes the form of a computer programme product 129 which is stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation is therefore modifiable by altering the computer programme's instructions.

Figure 1B:
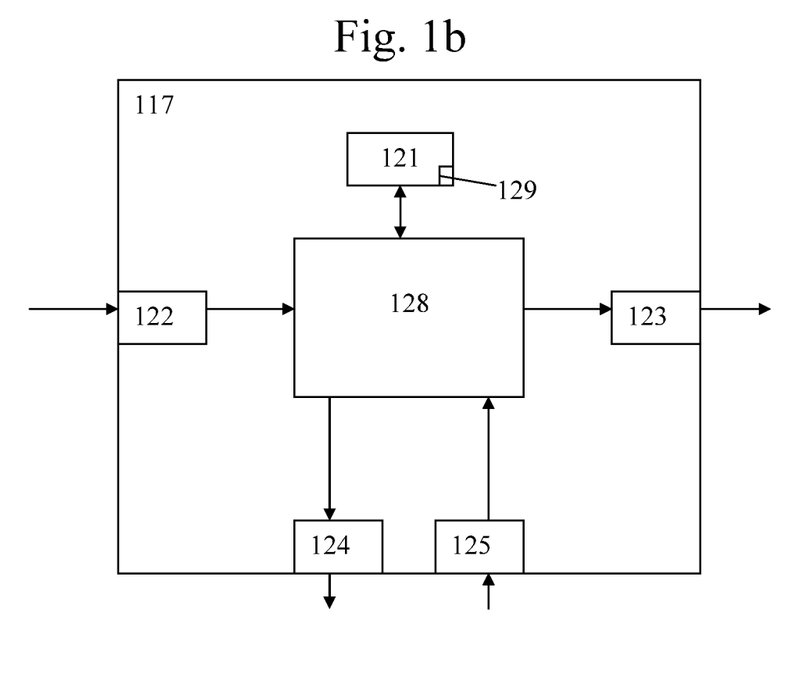
FIG. 1b depicts a control unit in a vehicle control system.

An example of a control unit (control unit 117) is depicted schematically in FIG. 1b, possibly comprising a calculation unit 128 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 128 is connected to a memory unit 121 which provides it with, for example, the stored programme code 129 and/or the stored data which the calculation unit 128 needs for it to be able to perform calculations. The calculation unit 128 is also arranged to store partial or final results of calculations in the memory unit 121.

The control unit 117 is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 128 can process. These signals are therefore conveyed to the calculation unit 128. The output signal sending devices 123, 124 are arranged to convert signals received from the calculation unit 128 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

Reverting to FIG. 1a, the vehicle 100 further comprises driveshafts 104, 105 which are connected to its powered wheels 113, 114 and are driven by an output shaft 107 of the gearbox 103 via an axle gear 108, e.g. a conventional differential.

When a gear change is effected on the vehicle 100 depicted in FIG. 1a, the clutch 106 is opened by a clutch actuator 115 controlled by a control unit, a different gear is engaged in the gearbox and the clutch then closes. As mentioned above, in such gear changes, it is important that the vehicle's control system has good knowledge of the clutch's contact point, i.e. the physical position at which the clutch disc comes into contact with the flywheel and can therefore begin to transmit torque between the engine and the rest of the power train.

Knowledge of the position of the contact point and hence (on the basis of the clutch's characteristic as below) knowledge of the torque which the clutch can transmit at different positions, make it possible for gear changes to be effected in a way which is not only comfortable for the driver, e.g. in that they can take place without unacceptable jerking, but also in a sparing way which reduces unnecessary power train wear. The gear change process may also be expedited in that during it the clutch need not be opened more than is necessary to release the clutch disc from the flywheel, rather than using the full potential movement of the lever arm.

Contact point in this description and the claims set out below means not only the physical position which the clutch disc is in when it just makes physical contact with the flywheel (or with some other element connected to the engine output shaft), i.e. the point at which the clutch begins to transmit torque, but also any representation of that position, so the contact point may for example be the position of the lever arm and/or the clutch actuator at the moment when the clutch disc just makes contact with the flywheel.

A contact point determination is usually done to find out the precise position at which the clutch begins to transmit torque. This may for example be done in any of the ways described below.

The contact point is not a fixed point but may vary, e.g. because the clutch wears over time. Although clutch wear may be regarded as negligible over a short period, the contact point might change while the vehicle is in motion, which means that even if it is determined at the beginning of a journey there is no certainty that the actual contact point later in the journey will correspond to that determined at the beginning.

Contact point adaptation therefore needs to be done when the position of the contact point is likely to have changed and be outside the limits which define good comfort and good torque response.

Figure 3:
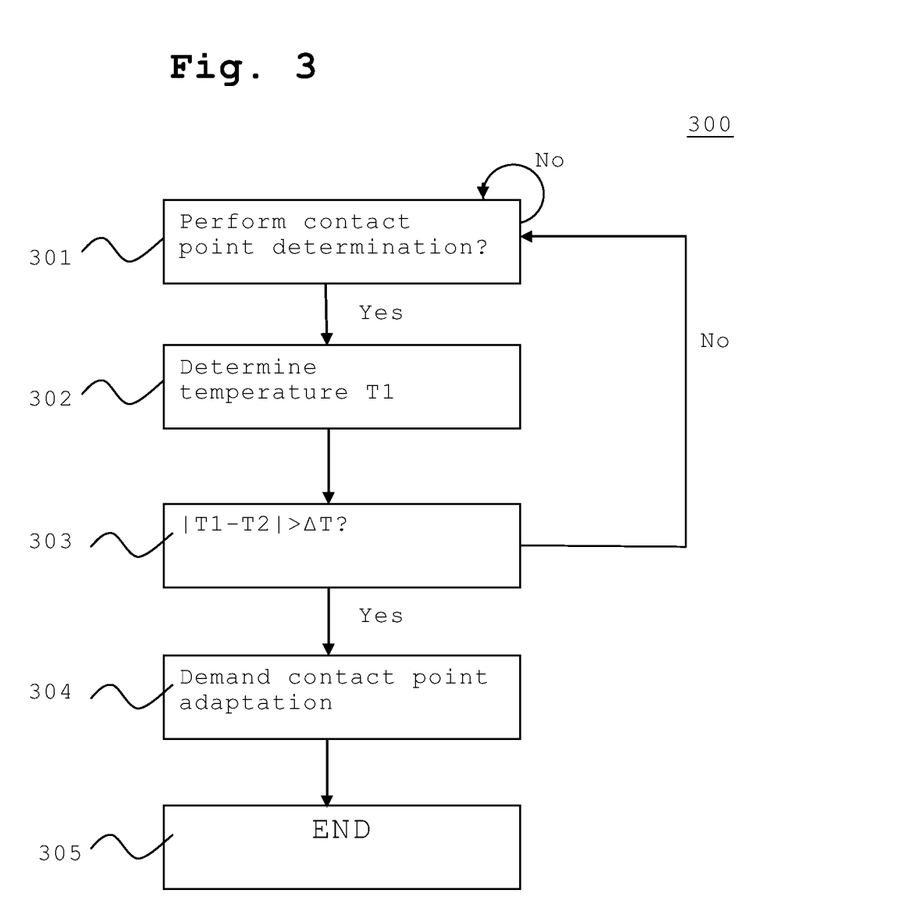
FIG. 3 depicts a method according to the present invention.

The present invention proposes a method which makes it possible to determine the need for contact point adaptation. A method 300 according to the present invention is illustrated in FIG. 3. It begins at step 301 by determining whether a need for contact point adaptation should be assessed. If such is the case, the method moves on to step 302. Determining the need for contact point adaptation may for example be done continuously or at certain intervals, e.g. once per second, once per minute or at some other suitable interval.

The contact point depends primarily on the wear and temperature of the clutch. Clutch wear may be regarded as constant over a short period, e.g. a single journey of the vehicle, but clutch temperature may vary greatly.

At step 302, a first temperature T1 of the clutch is therefore determined in the form of a representation of its actual temperature. This temperature T1 may for example be determined by means of one or more temperature sensors associated with the clutch. The temperature sensor may for example be situated on the engine block near to the flywheel or on the lever arm. T1 may also be a temperature measured at some other suitable location on the vehicle. The clutch temperature may be determined as the temperature directly measured by the sensor or be estimated, e.g. by means of a mathematical model or table.

The temperature of the clutch may for example depend on the power transmitted by it during sliding, the temperature of the gearbox, temperatures in the vehicle's surroundings, engine temperature variations depending on load, etc.

Figure 2:
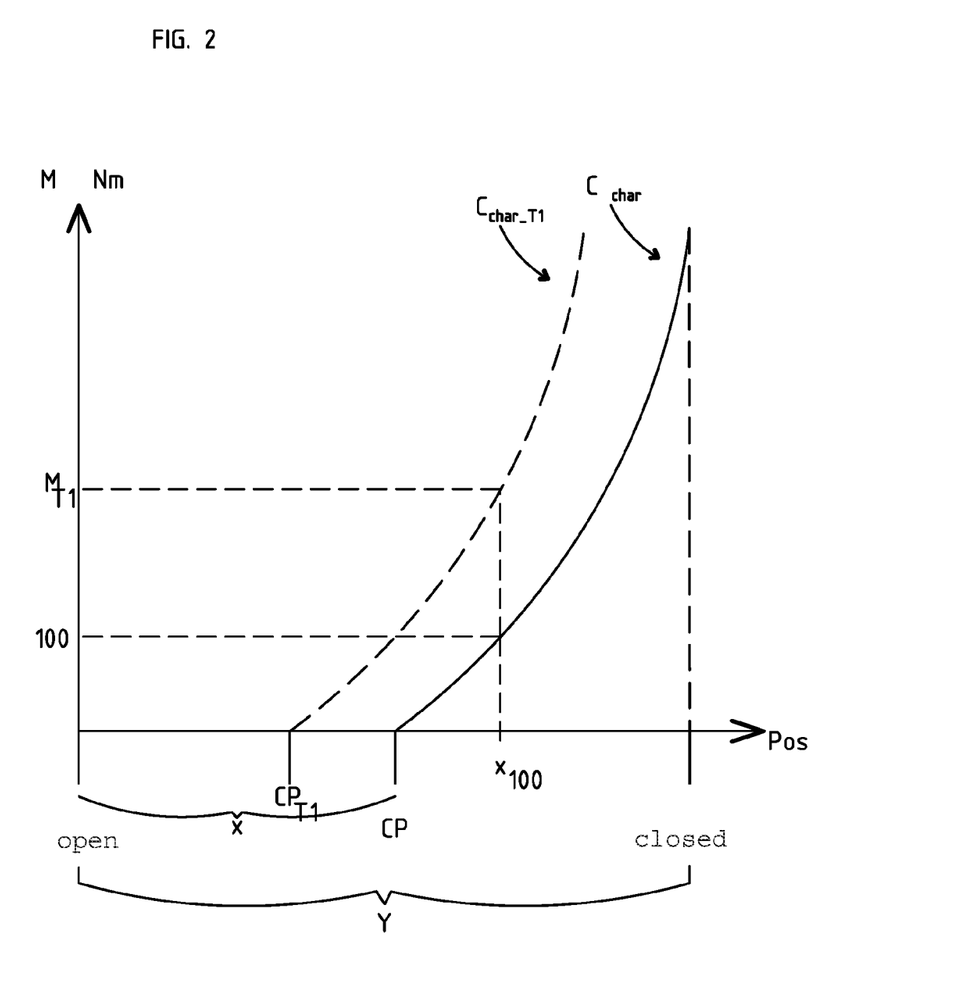
FIG. 2 depicts a clutch characteristic for a clutch in which the present invention may be applied.

FIG. 2 depicts an example of a characteristic for a clutch of the type to which FIG. 1a refers. The y axis denotes the torque which the clutch can transmit between engine and power train, and the x axis denotes the clutch's position (or for example the clutch actuator's position as above), whereby the origin represents the clutch open, i.e. with the clutch disc (the lever arm/the clutch actuator) at its one extreme position as far to the left as possible on the scale, whereas the closed position represents the position in FIG. 1 at which the clutch disc is as far to the left as possible and the clutch (the lever arm/the clutch actuator) is thus at its other extreme position.

The clutch disc when fully open is normally at a distance y from the engine's flywheel, so closing of the clutch involves the clutch disc initially moving a distance x before actually coming into physical contact with the flywheel. Once the clutch disc contacts the flywheel, at the contact point CP, torque transfer between the engine and rest of the power train can begin. The more the clutch closes thereafter (i.e. the more strongly the clutch disc engages the flywheel), the more torque can be transferred between the engine and the rest of the power train.

Exactly how much torque can be transferred at each point depends on the clutch's characteristic $C_{char}$, which may vary from clutch to clutch and which, like the contact point, needs to be estimated at regular intervals. No further description of such estimation of the clutch characteristic is given here. FIG. 2 depicts the clutch characteristic $C_{char}$ at the clutch temperature at the time when the vehicle is being set in motion. As previously mentioned, however, the clutch temperature will not be constant during a journey but will vary to a greater or lesser extent, e.g. depending on how often gear changes take place and on cargo load, running conditions and ambient conditions. Moving off from stationary also makes a substantial contribution to temperature build-up in the clutch in that at such times there may be a relatively long period of clutch sliding.

The position of the clutch's contact point CP is highly temperature-dependent, which means that the distance x in FIG. 2 will vary with temperature during the vehicle's journey.

This is indicated by the broken line in FIG. 2, which represents the clutch characteristic $C_{char\_T1}$ at a clutch temperature T1, and the position $CP_{T1}$ of the contact point at the temperature T1 which is higher than the temperature for the clutch characteristic represented by the continuous line. As may be seen in the diagram, the higher temperature in this case means that the clutch's contact point moves, in the direction of the arrow, nearer to the origin, i.e. nearer to the clutch fully open position. Consequently, the contact point will be reached more quickly upon closing of the clutch, i.e. already at position $CP_{T1}$ instead of position CP (the relationship might also be the opposite, i.e. the clutch's contact point moving further away from the clutch fully open position in which the contact point will be reached at a later stage of the closing of the clutch).

If the control system in this case has no knowledge of the correct contact point but thinks that it is at the position CP, then in response for example to a demand for closure of the clutch to the position at which 100 Nm can be transmitted via the clutch, i.e. the position $x_{100}$, a substantially greater torque $M_{T1}$ will instead be transmitted by the clutch, potentially leading to unacceptable jerking/fluctuations and in the worse case to damage to one or more power train components.

It is therefore desirable that the control system should always have correct knowledge of the clutch's prevailing contact point so that gear changes can take place as intended.

According to the state of the art, however, contact point determination is in principle done only at start-ups of the vehicle, in situations where the vehicle is stationary and in certain running situations in which slow gear changes may be allowed (i.e. long periods in neutral). A major problem, however, is that the vehicle may be driven in such a way that contact point adaptation only takes place when the vehicle is being started up, because opportunities for doing another adaptation never occur when the vehicle is in motion. Thus the vehicle may be driven all day without any other adaptation being done and without taking prevailing/changed driving conditions into account. Thus the vehicle's behaviour over a given day, particularly during gear changes, may seem to the driver to vary greatly for no apparent reason.

According to the present invention, a need for contact point adaptation is therefore determined on the basis of clutch temperature. The temperature T1 determined at step 302 is compared at step 303 with a second temperature T2 preferably measured by the same temperature sensor or in the same way as T1 but at the time of the latest previous contact point adaptation. This previous contact point adaptation may for example be that done at the beginning of the journey, as in FIG. 2, or subsequently.

The comparison in step 303 makes it possible to determine whether T1 deviates from T2 by more than a certain value ΔT. Deviation means that T1 may be ΔT higher or ΔT lower than T2. It is thus determined whether |T2−T1|>ΔT. The deviation ΔT may be set to a certain value which is always the same, but may also be arranged to vary, e.g. with clutch temperature. The method goes back to step 301 if |T2<T1|<ΔT but moves on to step 304 if |T2−T1|>ΔT.

Figure 4:
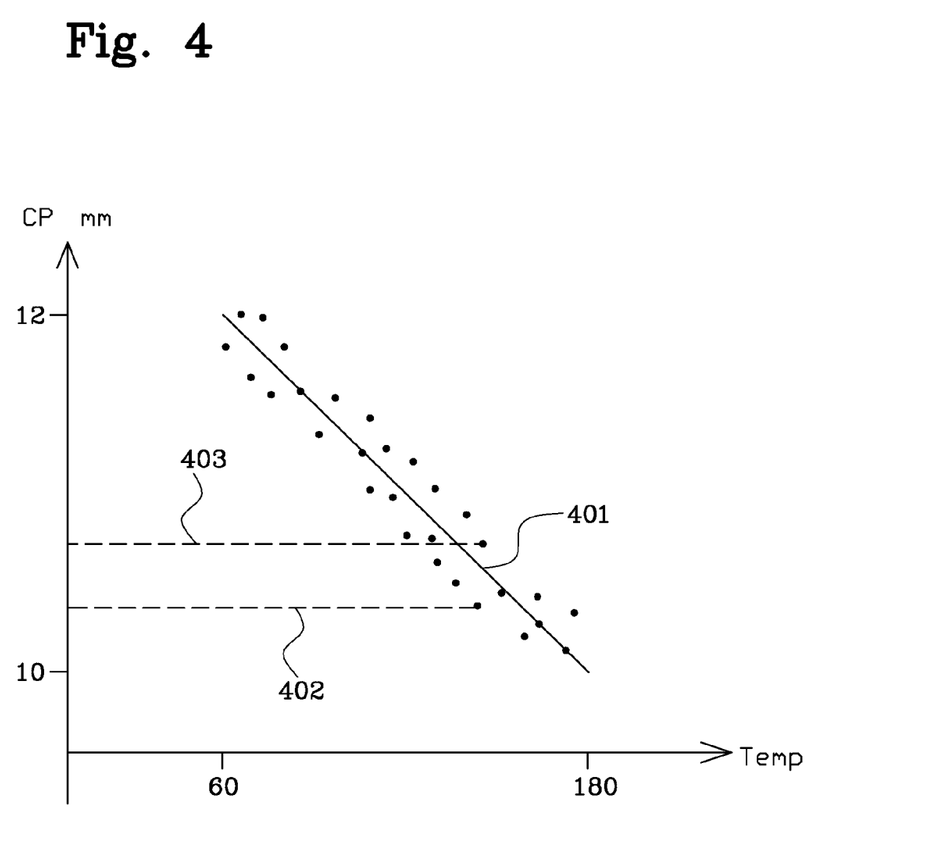
FIG. 4 depicts schematically the contact point's temperature dependency.

The value ΔT may also be controlled by an expected contact point change, i.e. be a value reflecting a temperature difference which is likely to cause such a large contact point change that contact point adaptation needs to be done. FIG. 4 depicts an example of temperature dependency of a clutch. The x axis denotes clutch temperature, determined for example in any of the ways exemplified above, and the y axis the position of the contact point expressed in terms of the distance x as in FIG. 2.

In the example depicted, the position of the contact point changes by up to about 2 mm depending on prevailing temperature. The distance x in FIG. 2 varies from about 12 mm to about 10 mm during temperature changes between about 60° and 180°. As will be appreciated, the temperature range may vary greatly depending on where/how the clutch temperature is determined/estimated.

Although this pattern may be approximated as substantially linear by the line 401, the variance will nevertheless be substantial, as indicated by points representing actual results of contact point adaptations. As may be seen in FIG. 4, substantially the same temperature may result in markedly different contact points, e.g. points 402 and 403, where substantially the same temperature results in large differences in the distance x according to FIG. 2. Thus modelling the contact point's temperature dependency may be difficult, and calculating the contact point's position on the basis of a mathematical model would often produce incorrect results.

However, the value ΔT may for example be determined on the basis of a model of expected contact point change as a function of temperature changes. This model may for example comprise the line 401 in FIG. 4 (although this line might be quite different and for example not necessarily be linear at all). The model may for example take the form of a mathematical expression or a tabular representation.

ΔT may for example be determined as the temperature difference which for the line 401 in FIG. 4 causes a certain displacement z of estimated contact point, e.g. by 0.1 mm (or a shorter or longer distance).

If it is determined at step 303 that the prevailing temperature of the clutch changes with ΔT and that a contact point change by a distance z is therefore to be expected, the method moves on to step 304 to demand contact point adaptation. The method then ends at step 305.

This is how need for contact point adaptation is determined according to the present invention. This adaptation may then be done when a suitable opportunity arises. Since it normally requires opening of the clutch, it is often inappropriate to do adaptation on, for example, an upgrade where gear changes may have to be effected quickly.

Figure 5:
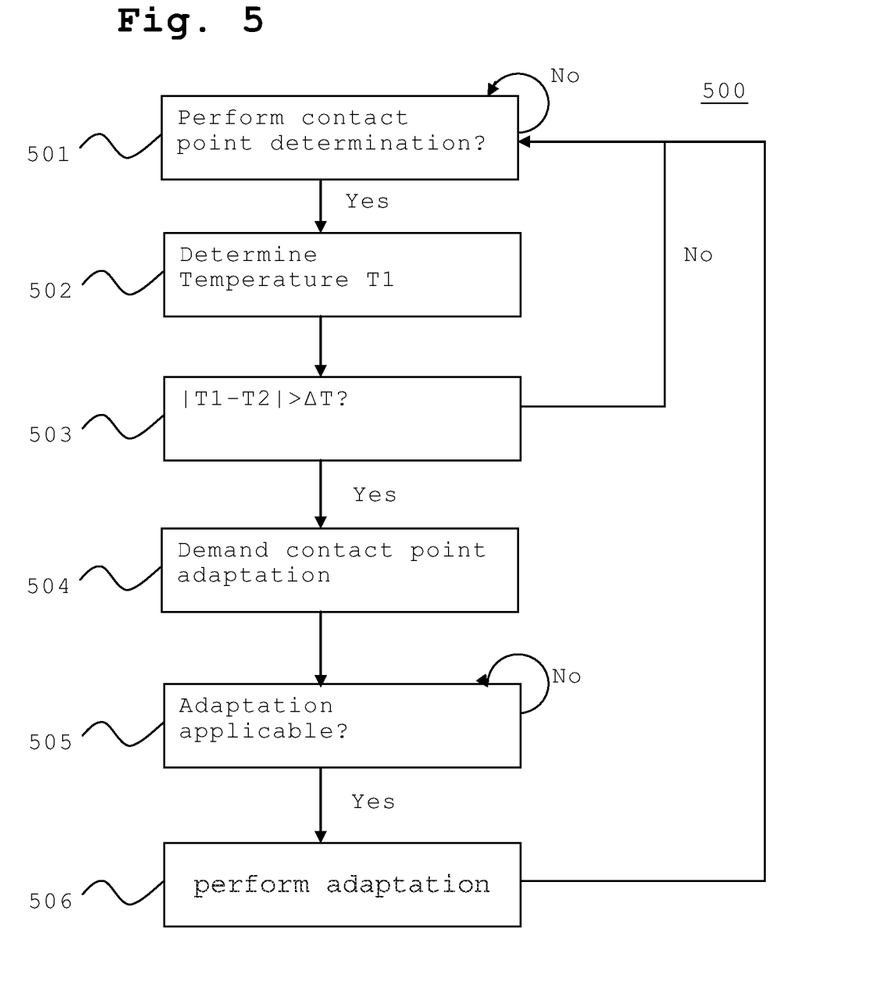
FIG. 5 illustrates another method according to the present invention

According to an embodiment, the method according to the invention comprises also the actual process of contact point adaptation. This is exemplified by the method 500 in FIG. 5, in which steps 501-504 correspond to steps 301-304 in FIG. 3 but the method further comprises a step 505, when it is deemed that contact point adaptation is required, of determining whether it is applicable, i.e. whether the vehicle's prevailing running conditions are such that contact point determination is applicable. The method may stay at step 505 until it is determined that the vehicle's driving situation is appropriate for doing contact point adaptation. For example, no contact point adaptation should be done when the vehicle is on a steep climb where clutch opening has as far as possible to be avoided. When such adaptation is applicable, it may be done at step 506, after which the method may end or revert to step 501 to determine whether the clutch temperature has again changed in such a way as to require another contact point adaptation.

For the vehicle not to be affected by estimation of the contact point's position, it needs to be done when the gearbox is in neutral position. The contact point adaptation may be done in various ways. In prior art this is normally done when the gearbox input shaft is stationary by moving the clutch 106 from open position to closed position, making it possible to determine the position at which the input shaft begins to accelerate. The contact point is for example determined as the position at which a rotation speed sensor on the gearbox input shaft registers a vehicle speed.

However, the time required for adaptation according to this method may be too long for it to take place unnoticed when the vehicle is in motion. This is partly because on many occasions it takes a long time for the gearbox input shaft to come to a halt after the gearbox has been put into neutral position, particularly if the gearbox has warmed up (which normally means that there is little friction). In certain vehicles this process may be expedited by the usually present countershaft normally connected to said input shaft being possibly provided with a brake. However, many vehicles lack this facility.

It may also be difficult, depending on type of speed sensor, to correctly detect low rotation speeds of the input shaft and hence the actual contact point. What is established instead is the point (position) which the clutch is at when the input shaft reaches a speed detectable by the sensor.

Contact point adaptation may for example also be done according to the solution described in Swedish patent application SE 0950663-5, which makes it possible for contact point adaptation to be done in a shorter time and hence on more occasions while the vehicle is in motion, e.g. during gear changes and during braking to a halt.

SE 0950663-5 uses the fact that the torque $M_{Clutch}$ transmitted by the clutch may be estimated as $M_{Clutch} = J\dot{\omega} + M_{Friction}$, in which J is the moment of inertia of the first gearbox element (which may be known or be eliminated from the calculations as described in said patent application). Calculating $M_{Clutch}$ involves estimating the angular acceleration $\dot{\omega}$ and $M_{Friction}$ (the friction moment which acts upon the gearbox input shaft (the first gearbox element)).

The gearbox input shaft, with the gearbox put into neutral, is accelerated to desired speed, e.g. by means of the engine output shaft, via the clutch 106, followed by estimation of the friction coefficient for inherent friction of the first gearbox element (e.g. the gearbox input shaft including the clutch disc, or the gearbox input shaft and the countershaft).

From open position, the clutch 106 is then closed, whereupon the torque transmitted by it as above is a function of the estimated friction moment, and upon closing of the clutch the torque transmitted by it is determined for a plurality of its positions. The contact point is determined as the position of the clutch where the torque transferred by it exceeds a first value, e.g. zero, i.e. $M_{Clutch} > 0$.

According to the present invention, the first gearbox element may take the form of any set of components which can be put into rotation by means of the clutch and be disconnected both from the vehicle's engine and from its powered wheels as above, i.e. a portion of the power train which can be disconnected both from the engine 101 and from the powered wheels 113, 114. The friction moment estimated as above is thus the friction moment for the combination of components.

The contact point adaptation may also be done according to the method described in the parallel Swedish patent application entitled "Method and system for determination of a contact point for a clutch" which has the same applicant, inventor and filing date as the present application and in which the engine's speed is controlled in such a way that, upon opening of the clutch, it is maintained as if the clutch was closed, making it possible for contact point determination to be done on more occasions without disturbing the driver when the vehicle is in motion.

Further embodiments of the device according to the invention are referred to in the attached claims. It should also be noted that the device may be modified according to various embodiments of the method according to the invention (and vice versa) and that the present invention is in no way restricted to the embodiments described above of the method or the device according to the invention, but relates to and comprises all embodiments within the protective scope of the attached independent claims.

The invention claimed is:

1. A method for determining a need for contact point adaptation for a clutch of a vehicle, such that said clutch is enabled to transmit driving power between a first power source comprising an engine of the vehicle and at least one powered wheel, the method comprises:
    determining a first temperature (T1) of said clutch at a first time;
    determining a second temperature (T2) of said clutch at a second time which precedes said first time;
    comparing said first temperature (T1) with said second temperature (T2); and
    determining said need for contact point adaptation when said first temperature (T1) differs from said second temperature (T2) by more than a first value ($\Delta T$).

2. A method according to claim 1, further comprising determining said second temperature (T2) on an occasion of a contact point adaptation.

3. A method according to claim 1, further comprising determining said first value ($\Delta T$) by means of a representation of said contact point's position as a function of temperature.

4. A method according to claim 1, further comprising determining said need for contact point adaptation when said contact point has an estimated position as a function of temperature changes by more than a first distance.

5. A method according to claim 1, wherein said first value ($\Delta T$) depends on at least one of said first temperature (T1) and said second temperature (T2).

6. A method according to claim 1, further comprising determining said first value ($\Delta T$) as a temperature difference expected to cause a first displacement z of said contact point.

7. A method according to claim 1, further comprising determining said first temperature (T1) on a basis of measuring said first temperature by a sensor or by a mathematical model or table.

8. A method according to claim 1, further comprising:
    performing said contact point adaptation when said first temperature (T1) differs from said second temperature (T2) by more than said first value ($\Delta T$).

9. A method according to claim 8, further comprising controlling a speed of said engine during said contact point adaptation to be above an idling speed of said engine.

10. A method according to claim 8, in which a gearbox is situated between said clutch and powered wheels of said vehicle, said gearbox comprises at least a first gearbox element connected to said clutch and disconnectable from said powered wheels;
    said method further comprising, during said contact point adaptation, disconnecting said first gearbox element from said powered wheels and placing said clutch in an open position;
    rotating said first gearbox element, and when said first gearbox element is in rotation, estimating a friction moment for said first gearbox element, wherein torque transmitted by said clutch is a function of said estimated friction moment;
    when said first gearbox element is in rotation, closing said clutch from said open position, and at that time, determining a representation of a torque transmitted by said clutch by using said estimated friction moment, for a plurality of positions of said clutch;
    determining said contact point by means of said representation of said torque transferred; and
    further comprising, before the closure of said clutch, accelerating said first gearbox element if its speed is below a second value.

11. A system for determining a need for a contact point adaptation for a clutch of a vehicle, wherein said clutch is configured to transmit driving power between a first power source in the form of an engine and at least one powered wheel of said vehicle;
    the system comprising:
    a temperature sensing arrangement for determining a first temperature (T1) of said clutch at a first time;
    a comparator for comparing said first temperature (T1) with a second temperature (T2) of said clutch at a second time which precedes said first time; and
    a device configured for determining a need for contact point adaptation when said first temperature (T1) differs from said second temperature (T2) by more than a first value ($\Delta T$).

12. A system according to claim 11, wherein said temperature sensing arrangement further comprising at least one second temperature sensor associated with said clutch or situated at a location on the vehicle and said temperature sensing arrangement is configured to determining said first temperature (T1).

13. A system according to claim 11, further comprising a gearbox situated between said clutch and said powered wheels.

14. A vehicle, provided with a system according to claim 11.

* * * * *